United States Patent [19]

Mochizuki

[11] Patent Number: 4,856,345
[45] Date of Patent: Aug. 15, 1989

[54] METHOD AND APPARATUS FOR MAKING COMPENSATION FOR DC OFFSET VOLTAGE GENERATED IN APLIFYING CIRCUIT IN ELECTROMAGNETIC FLOWMETER

[75] Inventor: Tutomu Mochizuki, Okazaki, Japan

[73] Assignee: Aichi Tokei Denki Co., Ltd, Nagoya, Japan

[21] Appl. No.: 180,736

[22] Filed: Apr. 12, 1988

[30] Foreign Application Priority Data

Apr. 13, 1987 [JP] Japan .................................. 62-91654

[51] Int. Cl.$^4$ .............................................. G01F 1/60
[52] U.S. Cl. .................................................. 73/861.17
[58] Field of Search ...................................... 73/861.17

[56] References Cited

U.S. PATENT DOCUMENTS

| | | |
|---|---|---|
| 4,157,035 | 12/1988 | Doll et al. . |
| 4,206,641 | 6/1980 | Takada .............................. 73/861.17 |
| 4,210,022 | 7/1980 | Boss ................................... 73/861.17 |
| 4,704,908 | 11/1987 | Blatter .............................. 73/861.17 |

FOREIGN PATENT DOCUMENTS 2084740 4/1982 United Kingdom .

*Primary Examiner*—Charles A. Ruehl
*Attorney, Agent, or Firm*—Pollock, Vande Sande & Priddy

[57] ABSTRACT

In magnetic induction flow measurement in which a flow rate of a fluid is measured by a DC magnetic field having a periodically reversed polarity, an apparatus is used to compensate a DC offset voltage generated in an amplifying circuit in an electromagnetic flowmeter in which a signal voltage produced across electrodes is sampled and stored in each of a pair of sampling periods where the magnetic field takes a positive polarity and a negative polarity, respectively. A difference between the sampling values is formed as an output signal voltage. The signal voltage is sampled and stored in a compensation period following the pair of sampling periods to produce a compensation voltage to be superimposed onto the signal voltage, and compensation is made on the signal voltage by using the compensation voltage which is held until a succeeding compensation period. The apparatus includes: a pair of the electrodes provided on a tube through which an electrically conductive fluid flows; a differential amplifier to which the pair of electrodes are respectively connected through capacitors; an adder having two inputs one of which is connected to an output of the differential amplifier; an ampifier having an input connected to an output of the adder; an integration circuit having a resistor, a resistor and a capacitor and an operational amplifier; and a switch inserted between the amplifier and the integration circuit for sampling the signal voltage in the sampling period.

4 Claims, 6 Drawing Sheets

METHOD AND APPARATUS FOR MAKING COMPENSATION FOR DC OFFSET VOLTAGE GENERATED IN AMPLIFYING CIRCUIT IN ELECTROMAGNETIC FLOWMETER

BACKGROUND OF THE INVENTION

The present invention relates to a method and apparatus for making compensation for a DC offset voltage generated in an amplifying circuit in an electromagnetic flowmeter without being affected by AC noise generated between electrodes of the electromagnetic flowmeter.

In magnetic induction flow measurement in which a flow rate of a fluid is measured by means of a DC magnetic field having a periodically reversed polarity, a method of making compensation for a DC offset voltage generated in an amplifying circuit in an electromagnetic flowmeter is known as disclosed in JP-A-No. 57-146113, the method comprising the steps of: sampling and storing an effective signal voltage in each of sampling periods where the magnetic field takes a positive polarity and a negative polarity respectively; forming a difference between the sampling values; sampling and storing the signal voltage in a compensation period following each sampling period to thereby produce a compensation voltage to be superimposed onto the signal voltage; making compensation on the signal voltage by using the compensation voltage to thereby make the signal voltage zero and holding the compensation voltage until a succeeding compensation period.

However, an actual trouble voltage can not be regarded as a simple DC voltage and has a large variation which can not be disregarded even in half period of excitation.

Specifically, problems are as follows.

(1) Electrochemical noises having a wide frequency range are generated across the electrodes and the magnitude and frequency components of the noises vary depending on the kind and amount of ions in a fluid, and materials and surface conditions of the electrodes.

(2) Pulse-like noises having widths within a range of from several msec to several tens msec may be generated in a case of a slurry fluid.

Figure 6:
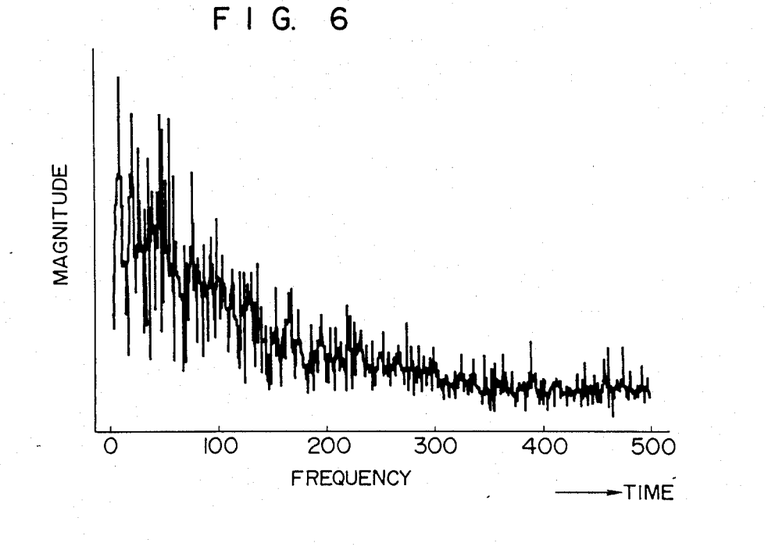
FIG. 6 is a graph showing frequency components of high velocity fluid noises generated at electrodes.

(3) Random noises which rapidly increase when the flow rate in the measurement tube rises $3 \sim 4$ m/sec or more, and such random noises (hereinafter referred to as "a high velocity fluid noise" may be significant trouble noises. FIG. 6 shows an example of actually measured data of the relationship between the frequency and magnitude of such a high velocity fluid noise. As seen in FIG. 6, the high velocity fluid noise is a gathering of a number of noises within a wide frequency range and has particularly large magnitudes in the vicinity of the frequency of the excitation current, that is, at about one $\sim$ several tens Hz.

(4) On the other hand, there is a tendency to make the excitation current small to reduce the power consumption in the electromagnetic flowmeter, and the signal voltage is drastically reduced to about 10 $\mu$V per 1 m/sec of flow rate.

In the case of such a very small voltage signal being used, the foregoing AC noises superimposed on a flow signal can not be disregarded.

In the conventional method in which a signal voltage is compensated to be zero in a compensation period, there have been problems in that large variations are caused in the amplified output when such an AC noise is superimposed on a flow signal, and particularly in that very large variations are caused when a pulse-like noise is superimposed on a flow signal in a compensation period.

Further, in the prior art, a differential amplifier in the input stage is directly coupled with electrodes. Accordingly, it is necessary to reduce the amplification degree of the differential amplifier to about $1 \sim 10$ so that the differential amplifier cannot be saturated by a trouble DC voltage. Accordingly, there has been a problem in that the amplification degree of the input stage is not sufficient in a low power consumption electromagnetic flowmeter in which very small signals not larger than 10 $\mu$V per 1 m/sec of flow rate are used.

SUMMARY OF THE INVENTION

It is an object of the present invention to provide a method and an apparatus, in an electromagnetic flowmeter, in which variations are hardly caused in an output of an amplifying circuit even if large noises varying at random are superimposed on an effective signal, in which a differential amplifier having a large amplification degree can be used so as to be particularly effective to a low power consumption type electromagnetic flowmeter, and in which compensation can be made for a DC offset voltage generated in the differential amplifier and an AC amplifier in the next stage.

In order to attain the above object of the present invention, in magnetic induction flow measurement in which a flow rate of a fluid is measured by means of a DC magnetic field having a periodically reversed polarity, a method of making compensation for a DC offset voltage generated in an amplifying circuit in an electromagnetic flowmeter comprises the steps of: sampling and storing a signal voltage produced across electrodes in each of a pair of sampling periods where the magnetic field takes a positive polarity and a negative polarity respectively and forming a difference between the sampling values as an output signal voltage; sampling and storing the signal voltage in a compensation period following the pair of sampling periods to thereby produce a compensation voltage to be superimposed onto the signal voltage; making compensation on the signal voltage by using the compensation voltage and holding the compensation voltage until a succeeding compensation period; in which a time constant of a compensation circuit is made large so as to make the compensation in the compensation period be $60\% \sim 10\%$ of the value before compensation to thereby make the compensation for the DC offset voltage generated in the amplifying circuit without being affected by AC noises generated across the electrodes.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

Referring to the drawings, an embodiment of the present invention will be described hereunder.

Figure 1:
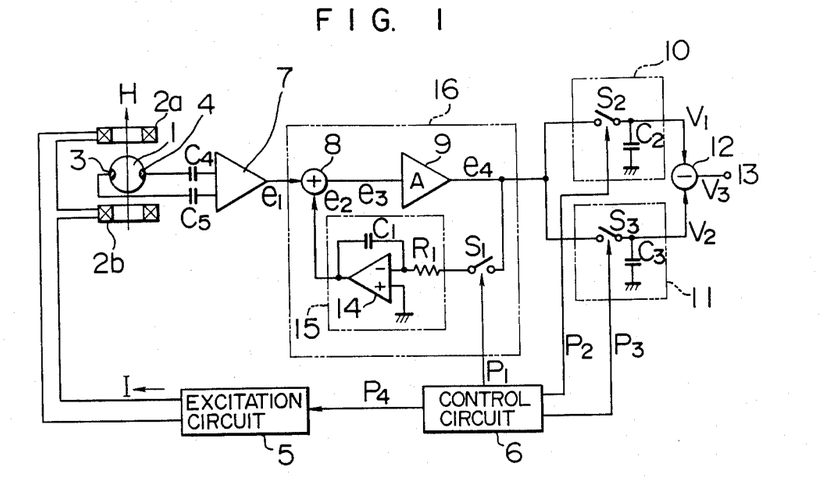
FIG. 1 is a block diagram briefly showing the arrangement of an embodiment of the apparatus according to the present invention.

In FIG. 1, a magnetic field H is generated by two excitation coils 2a and 2b perpendicularly to an axis of a tube 1 having an insulated inner surface. A pair of electrodes 3 and 4 are provided inside the tube 1 so that an induction voltage proportional to the flow velocity of an electrically conductive fluid across the magnetic field can be taken out from those electrodes 3 and 4.

An excitation circuit 5 is arranged to supply an excitation current to the excitation coils 2a and 2b in synchronism with a control signal P4 from a control circuit 6.

The electrodes 3 and 4 are connected to the inputs of a differential amplifier 7 through capacitors C4 and C5, so that a trouble voltage and a slow change thereof are blocked by those capacitors C4 and C5 and only an effective signal and high frequency noises are supplied to the differential amplifier 7.

The output of the differential amplifier 7 is connected to one input of an adding circuit 8 the output of which is in turn connected to the input of an amplifier 9 having an amplification degree of A.

Two sampling and holding circuits 10 and 11 are connected in parallel to each other to the output of the amplifier 9. For the sake of simplification, the sampling and holding circuit 10 is constituted by a switch S2 driven by a control signal P2 from the control circuit 6 and a capacitor C2. If the switch S2 is turned on, the capacitor C2 is charged to a voltage equal to an output voltage of the amplifier 9.

If the switch S2 is turned off, the sampling value stored in the capacitor C2 is applied as a voltage V1 to the output terminal of the sampling and holding circuit 10 until the switch S2 is turned on next. An impedance converter (not shown) may be connected to the after stage of the sampling and holding circuit 10 in order to prevent the capacitor C2 from discharging after the switch S2 is turned off.

Similarly to the sampling and holding circuit 10, the sampling and holding circuit 11 is constituted by a switch S3 driven by a control signal P3 from the control circuit 6 and a capacitor C3. When the switch S2 is in its ON-state, the capacitor C2 is charged to a voltage equal to an output voltage of the amplifier 9.

If the switch S3 is turned off, the sampling value stored in the capacitor C3 is applied as a voltage V2 to the output terminal of the sampling and holding circuit 11 until the switch S3 is turned on next. An impedance converter is not shown also in this case.

The respective outputs of the sampling and holding circuits 10 and 11 are connected to the two inputs of a subtracting circuit 12 so that a signal V3 corresponding to a difference between the sampling values V1 and V2 respectively stored in the sampling and holding circuits 10 and 11 appears at the output 13 of the subtracting circuit 12. The output signal V3 forms a measurement signal representing the flow velocity in the tube 1.

An integrating circuit 15 constituted by a resistor R1, a capacitor C1 and an operational amplifier 14 is connected to the output of the control circuit 6 through a switch S1 driven by a control signal P1 from the control circuit 6. The output of the integrating circuit 15 is connected to the second input of the adding circuit 8.

Figure 2:
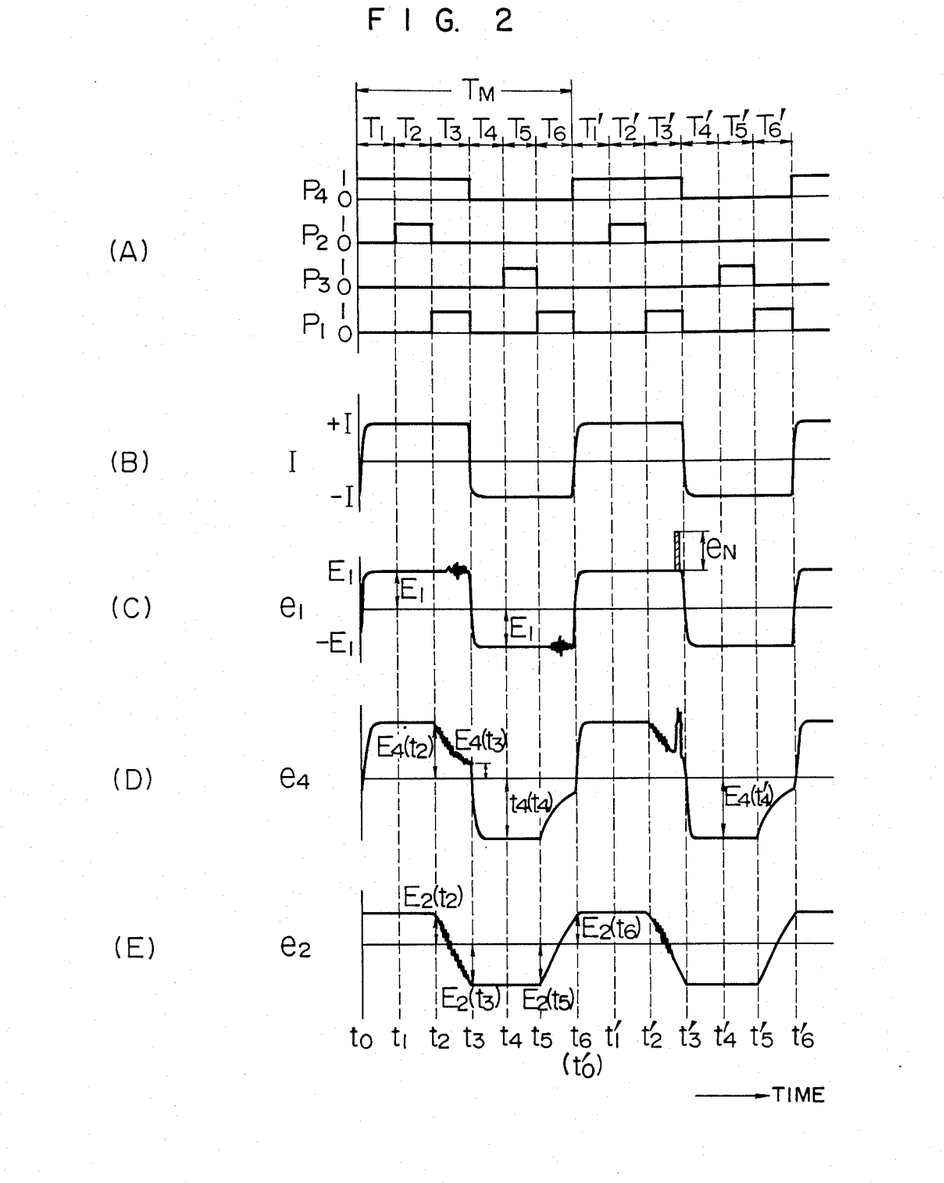
FIG. 2 is a signal waveform diagram showing operating signals at various operating points in the embodiment of FIG. 1.

Waveforms of the operating signals at various operating points in FIG. 1 are shown in the diagrams P4, P2, P3, P1, I, $e_1$, $e_4$, $e_2$ of FIG. 2.

In the diagram (A) of FIG. 2, the period TM indicates the whole measuring cycle which is equal to the period of the alternating magnetic field generated by the excitation coils 2a and 2b and which is divided into six time portions $T_1T_2$, $T_3$, $T_4$, $T_5$ and $T_6$ which start from the points of time $t_0$, $t_1$, $t_2$, $t_3$, $t_4$ and $t_5$ respectively.

The time portion $T_6$ terminates at the point in time $t_6$ which coincides with the point in time $t_0'$ from the next measuring cycle starts. In the diagram (A), the succeeding measuring cycle having the time portions $T_1'$, $T_2'$, $T_3'$, $T_4'$, $T_5'$ and $T_6'$ which terminates at the points in time $t_1'$, $t_2'$, $t_3'$, $t_4'$, $t_5'$ and $t_6'$ respectively is illustrated.

In the diagram (A) of FIG. 2, the waveforms of the control signals P4, P3, P2 and P1 generated from the control circuit 6 are illustrated. Each of the control signals P4, P3, P2 and P1 has a signal level which varies between "1" and "0".

When the control signals P1, P2 and P3 are applied to the switches S1, S2 and S3 respectively, the signal level "1" indicates the ON-state of the switch and the signal level "0" indicates the OFF-state of the switch.

During the time portions $T_1$, $T_2$ and $T_3$ in which the control signal P4 is applied to the excitation circuit 5 with its signal level maintained at "1", a DC excitation current I flows in the positive direction as shown in the diagram (B) of FIG. 2. On the other hand, during the time portions $T_4$, $T_5$ and $T_6$ in which the control signal P4 is applied to the excitation circuit 5 with its signal level maintained at "0", the DC excitation current I flows in the negative direction in the excitation coils 2a and 2b. The magnetic field H has the same temporal changes with the excitation current I. The switch S2 of the sampling and holding circuit 10 is made to be in its ON-state by the control signal P2 during the time portion $T_2$ in each measuring cycle. Accordingly, the sampling and holding circuit 10 samples the output voltage of the amplifier 9 at an intermediate portion of the positive period of the magnetic field H and stores the sampling value.

The switch S3 of the sampling and holding circuit 11 is made to be in its ON-state by the control signal P3 during the time portion $T_5$ in each measuring cycle. Accordingly, the sampling and holding circuit 11 samples the output voltage of the amplifier 9 at an intermediate portion of the negative period of the magnetic field H and stores the sampling value.

The switch S1 of the integrating circuit 15 is made to be in its ON-state by the control signal P1 during the time portions $T_3$ and $T_6$ in each measuring cycle.

When the switch S1 is turned on, a closed loop adjusting circuit 16 is formed from the output of the amplifier 9 to the input of the same amplifier 9 through the integrating circuit 15 and adding circuit 8. In the closed loop adjusting circuit 16, the integrating circuit 15 integrates the output voltage $e_4$ of the amplifier 9 with a time constant which is equal to the product $C1 \times R1$ between the capacitance C1 and the resistance R1 of the capacitor C1 and the resistor R1 respectively during a period from the point in time $t_2$ where the switch S1 is turned on to the point in time $t_3$ where the switch S1 is turned off.

The output voltage $e_2$ of the integrating circuit 15 changes from a level $E_2(t_2)$ of positive polarity to another level $E_2(t_3)$ of negative polarity as shown in the diagram E of FIG. 2 to thereby produce a compensation voltage $E_2(t_3)$.

The compensation voltage $E_2(t_3)$ has a reverse polarity relative to the output voltage $e_1$ of the differential amplifier 7 and has a value which is proportional to the output voltage $e_1$ with a predetermined ratio smaller than 1.

As the output voltage $e_2$ of the integrating circuit 15 changes, the output voltage $e_4$ of the amplifier 9 decreases exponentially and has a value $E_4(t_3)$ at the point in time $t_3$ which is proportional to the value $E_4(t_2)$ at the point in time $t_2$ with a predetermined ratio. This state is illustrated in the diagram (D) of FIG. 2.

After the switch S1 is turned off, the integrating circuit 15 becomes in the holding state and stores the compensation voltage $E_2(t_3)$ in the period of the time portions $T_4$ and $T_5$.

The thus stored compensation voltage is added in the adding circuit 8 to the signal voltage $e_1$ which is successively supplied to the adding circuit 8 every time the compensation voltage is stored.

After the switch S1 is turned off, the output voltage $e_1$ of the differential amplifier 7 takes a value $E_1$ of negative polarity in the time portion $T_4$ where the polarity of the excitation current becomes negative.

Next, in the time portion $T_6$ where the switch $S_1$ is turned on again, the output voltage $e_4$ of the amplifier 9 decreases exponentially in the same manner with the case of the time portion $T_4$ and integrating circuit 15 produces a compensation voltage $E_2(t_6)$ of the reverse polarity relative to the value $E_2(t_3)$ at the point in time $t_3$.

Thus, the time portions $T_1 \sim T_6$ forms one period TM of the compensation cycle.

The foregoing operation of the closed loop adjusting circuit 16 will be described more in detail hereunder by use of mathematical expressions.

When the switch S1 is turned on, the integrating circuit 15 integrates the output voltage $e_4$ of the amplifier 9 with the time constant $C1 \times R1$, and the output voltage $e_2$ of the integrating circuit 15, which was $E_2(t_2)$ of positive polarity at the point in time $t_2$, becomes $E_2(t_3)$ of negative polarity at the point in time $t_3$. This relationship is expressed by the equation (1) as follows:

$$E_2(t_3) = E_2(t_2) \cdot X - E_1 \cdot (1-X) \quad (1)$$

in which X represents the value as follows.

$$X = \epsilon^{-(A/C1 \cdot R1) \cdot T_3} \quad (2)$$

output voltage $e_4$ of the amplifier 9 is obtained by amplifying, with the amplification degree of A thereof, the addition value $e_3$ obtained in the adding circuit 8 by adding the output voltage $e_1$ of the differential amplifier 7 and the output voltage $e_2$ of the integrating circuit 15, and therefore the value $e_4$ can be expressed by the equation (3) as follows.

$$\begin{aligned} e_4 &= A \cdot e_3 \\ &= A \cdot (e_1 + e_2) \end{aligned} \quad (3)$$

By substituting the equation (1) for the value $e_2$ in the equation (3), the output voltage $E_4(t_3)$ of the amplifier 9 at the point in time $t_3$ can be obtained as follows.

$$\begin{aligned} E_4(t_3) &= A \cdot \{E_1 + E_2(t_2) \cdot X - E_1 \cdot (1-X)\} \\ &= A \cdot \{E_2(t_2) + e_1\} \cdot X \end{aligned}$$

From the equation (3)
$$E_4(t_2) = A \cdot \{E_1 + E_2(t_2)\}$$

Therefore
$$E_4(t_3) = E_4(t_2) \cdot X \quad (4)$$

That is, the value $E_4(t_3)$ of the output voltage $e_4$ of the amplifier 9 at the point in time $t_3$ is a product of the value $E_4(t_2)$ of the output voltage $e_4$ at the point in time $t_2$ and the value X.

Next, if the polarity of the excitation current I changes from positive to negative in the time portion $T_4$, the output voltage $e_1$ of the differential amplifier 7 changes to a value $-E_1$.

The value $E_4(t_4)$ of the output voltage $e_4$ of the amplifier 9 at the point in time $t_4$ where the excitation current has reached a steady state is expressed as follows.

$$E_4(t_4) = A \cdot (e_1 + e_2) \quad (5)$$

At the point in time $t_4$, $e_1 = -E_1$, and as the compensation voltage $e_2$ the value $E_2(t_3)$ at the point in time $t_3$ is being stored. Accordingly, by substituting these values for $e_1$ and $e_2$ in the equation (5), the value $E_4(t_4)$ is expressed as follows.

$$\begin{aligned} E_4(t_4) &= A \cdot \{-E_1 + E_2(t_2) \cdot X - E_1 \cdot (1-X)\} \\ &= -2 \cdot A \cdot E_1 + A \cdot \{E_1 + E_2(t_2)\} \cdot X \end{aligned} \quad (6)$$

Since $A \cdot \{E_1 + E_2(t_2)\} = E_4(t_2)$, $\quad (7)$ $$E_4(t_4) = -2 \cdot A \cdot E_1 + E_4(t_2) \cdot X$$

In the steady state, the absolute values of the positive and negative values of the output of the adding circuit 8 is equal to each other, that is, $E_4(t_2) = -E_4(t_4)$. Accordingly, $$E_4(t_2) = -2 \cdot A \cdot E_1 - E_4(t_4) \cdot X \quad (8)$$

$$\therefore E_4(t_4) = -2A/(1+X) \cdot E_1$$

From the equation (8), the amplification degree G of the closed loop adjusting circuit 16 having outputs of positive and negative polarities is expressed in a general form as follows.

$$G = e_4/e_1 = (2 \cdot A)/(1+X) \quad (9)$$

From the equation (4), X is expressed as follows.

$$X = \{E_4(t_3)\}/\{E_4(t_2)\} \qquad (10)$$

Figure 8:
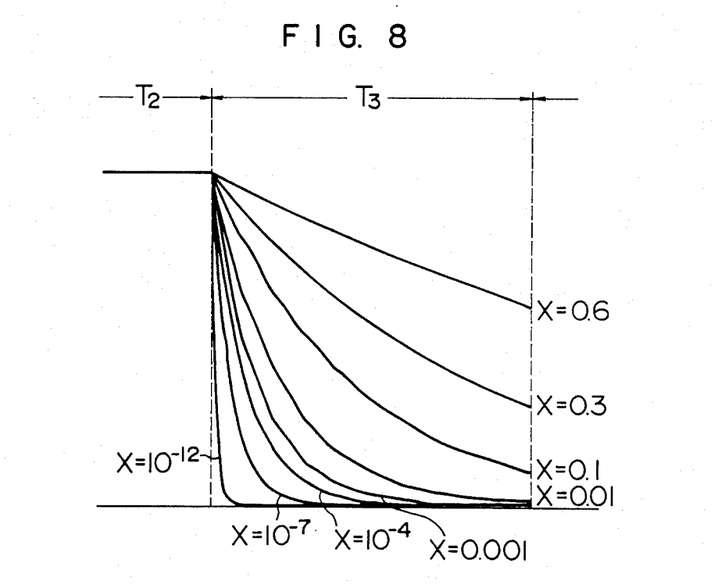
FIGS. 8 to 10 are graphs for explaining operation and effects of the embodiment of the present invention.

Accordingly, X can be advantageously used as a coefficient representing the degree of compensation by the closed loop adjusting circuit 16. FIG. 8 shows the temporal operation of the output voltage $e_4$ of the amplifier 9 in the time portion $T_3$ with X as a parameter.

In the prior art of JP-A-57-146113, it is an object thereof to double the output voltage $e_4$ of the amplifier 9 by adding the stored value in the time portion $T_3$ to the stored value in the time portion $T_5$. Accordingly, it is a condition to make compensation so as to make the output value in the time portion $T_3$ zero as soon as possible. To this end, referring to FIG. 8, X takes a very small value of the order of $10^{-6} \sim 10^{-30}$.

On the contrary, according to the present invention, the optimum value of X is 0.6~0.1 (60%~10% compensation).

In order to explain the effect caused by the selection of X to be a value within a range of from 0.1 to 0.6, assume the case where a noise of a single pulse is superimposed onto the last period of the time portion $T_3'$ which is a compensation period (see FIG. 2).

Figure 3:
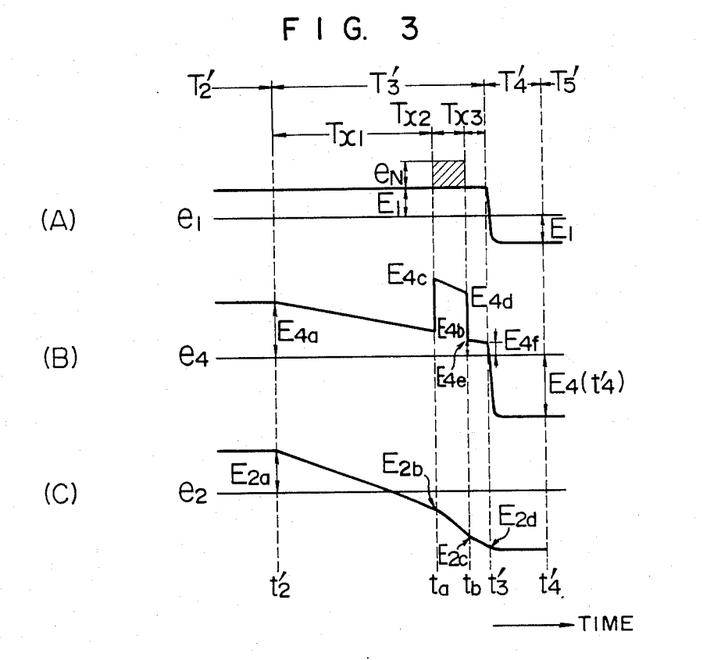
FIG. 3 is an enlarged signal waveform diagram showing a part of FIG. 2.

FIG. 3 shows an enlarged part of FIG. 2 before and after the time portion $T_3'$ in the diagram (A) of FIG. 2.

The diagram (A) of FIG. 3 shows the output voltage $e_1$ of the differential amplifier 7 corresponding to that shown in the diagram (C) of FIG. 2, and illustrates the case where a pulse-like noise is superimposed on the output voltage $e_1$ of the differential amplifier 7. That is, a noise having a pulse width of $T_{x2}$ is superimposed on the output voltage $e_1$ of the differential amplifier 7 at the point in time $t_a$ a period of time $T_{x1}$ after the point in time $t_2'$, and the noise disappears at the point in time $t_b$ a period of time $T_{x3}$ before the point in time $t_3'$. Assume now that the peak value $e_N$ is equal to the output voltage $E_1$ of positive polarity, and that the values of the output voltage $e_4$ of the amplifier 9 and the output voltage $e_2$ of the integrating circuit 15 at the point in time $t_2'$ at which the switch S1 is turned on are $E_{4a}$ and $E_{2a}$ respectively. After the switch S1 is turned on, the integrating circuit 15 integrates the output voltage $e_4$ of the amplifier 9 with the time constant $C1 \times R1$. The value $E_{2b}$ of the output voltage $e_2$ of the integrating circuit 15 at the point in time $t_a$ is expressed by the following equation (11) similarly to the equation (1).

$$E_{2b} = E_{2a} \cdot X_1 - E_1 \cdot (1 - X_1) \qquad (11)$$

in which $X_1$ represents the value as follows.

$$X = \epsilon^{-(A/C1 \cdot R1) \cdot T_{x1}} \qquad (12)$$

The equation (12) is the same as the equation (2) except that the integration time is changed from $T_3$ to $T_{x1}$.

At the point in time $t_a$ where the compensation voltage takes the value $E_{2b}$, the value $E_{4b}$ of the output voltage $e_4$ of the amplifier 9 is expressed by $$E_{4b} = A \cdot (E_1 + E_{2b}).$$

Though the output voltage $e_1$ of the differential amplifier 7 is increased at this point in time $t_a$ by a value $e_N$ corresponding to the peak value $e_N$ of the noise, the output voltage $e_2$ of the integrating circuit 15 does not instantaneously change but takes the value $E_{2b}$ as it is. Accordingly, the value $E_{4c}$ of the output voltage $e_4$ of the amplifier 9 after the noise has been superimposed thereon is increased from the value $E_{4b}$ by the product of the peak value $e_N$ of the noise and the amplification degree A, that is, $A \times e_N$. Accordingly, $$\begin{aligned} E_{4c} &= E_{4b} + A \cdot e_N \\ &= A \cdot (E_1 + E_{2b} + e_N) \end{aligned} \qquad (13)$$

The integrating circuit 15 integrates the output voltage of the amplifier 9 including the noise at the time constant $C1 \times R1$ in the time portion $T_{x2}$ in which the noise is superimposed on the output voltage of the amplifier 9, and the value $E_{2c}$ of the output voltage $e_2$ of the integrating circuit 15 at the point in time $t_b$ becomes as follows.

$$E_{2c} = E_{2b} \cdot X_2 - (E_1 + e_N) \cdot (1 - X_2) \qquad (14)$$

in which $X_2$ represents the value as follows.

$$X_2 = \epsilon^{-(A/C1 \cdot R1) \cdot T_{x2}} \qquad (15)$$

The equation (15) is the same as the equation (2) except that the integration time is changed from $T_3$ to $T_{x2}$.

At the point in time $t_b$ where the compensation voltage takes the value $E_{2c}$, the value $E_{4d}$ of the output voltage $e_4$ of the amplifier 9 is a product of the amplification degree A of the amplifier 9 and the sum of the compensation voltage $E_{2c}$ and the value $(E_1 + e_N + E_{2c})$ produced by the differential amplifier 7. Accordingly, the value $E_{4d}$ is expressed as follows.

$$E_{4d} = A \cdot (E_1 + e_N + E_{2c}) \qquad (16)$$

Even if the noise disappears at this point in time $t_b$, the output voltage $e_2$ of the integrating circuit 15 does not instantaneously change but takes the value $E_{2c}$ as it is. Accordingly, the value $E_{4e}$ of the output voltage $e_4$ of the amplifier 9 after the noise has disappeared is decreased from the value $E_{4d}$ by the decrease of the noise, as expressed as follows.

$$E_{4e} = A \cdot (E_1 + E_{2c}) \qquad (17)$$

The integrating circuit 15 integrates the output voltage of the amplifier 9 corresponding to only the effective signal without any noise in the time portion $T_{x3}$, and the value $E_{2d}$ of the output voltage $e_2$ of the integrating circuit 15 at the point in time $t_3'$ becomes as follows.

$$E_{2d} = E_{2c} \cdot X_3 - E_1 \cdot (1 - X_3) \qquad (18)$$

in which X represents the value as follows.

$$X_3 = \epsilon^{-(A/C1 \cdot R1) \cdot T_{x3}} \qquad (19)$$

When the compensation voltage has become $E_{4d}$ at X3 the point in time $t_3'$, the value $E_{4f}$ of the output voltage $e_4$ of the amplifier 9 at this point in time becomes as follows.

$$E_{4f} = A \cdot (E_1 + E_{2d}) \qquad (20)$$

When the polarity of the excitation current I is reversed in the time portion $T_4'$ after the switch S1 has been turned off at the point in time $t_3'$, the output voltage $e_1$ of the differential amplifier 7 is also reversed in polarity so as to be $-E_1$.

On the other hand, since the output voltage $e_2$ of the integrating circuit 15 is maintained to be the compensation voltage $E_{2d}$, the value $E_4(t_4')$ of the output voltage $e_4$ of the amplifier 9 at the point in time $t_4'$ is expressed as follows.

$$E_4(t_4') = A \cdot (-E_1 + E_{2d}) \qquad (21)$$

This value $E_4(t_4')$ is the output voltage corresponding to the last half period of the excitation, and has an error in comparison with the value $E_4(t_4)$ in the case where there is no noise superimposed.

Assuming that K represents the ratio of the value $E_4(t_4')$ to the value $E_4(t_4)$, that is, $$K = E_4(t_4!)/E_4(t_4) \qquad (22)$$

the value K may be utilized to express the degree of influence of a single pulse noise. The value K represents the magnification of the output voltage of the amplifier 9 in the next half period in which a noise is superimposed on the output voltage relative to the correct output voltage of the amplifier 9.

Figure 9:
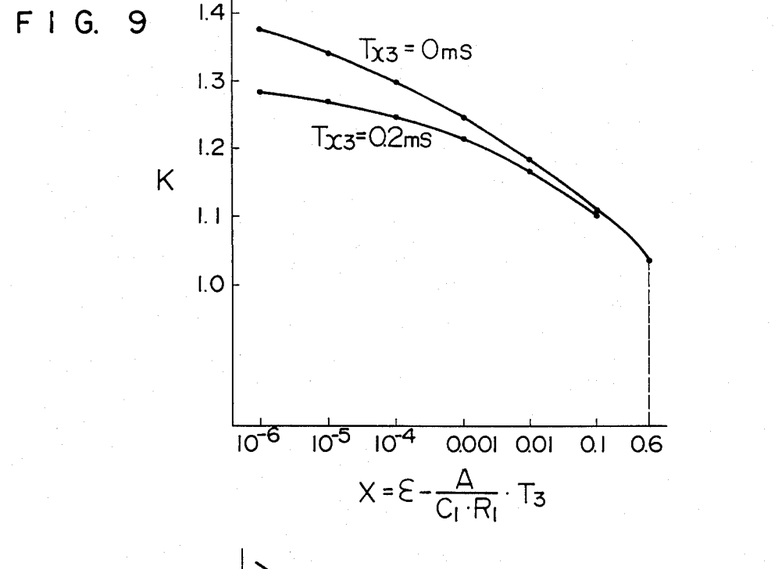

In FIG. 9, the change of influence of a single pulse noise depending on the value of X is expressed by using the value K. FIG. 9 is a result of simulation effected to the value of K in the range of from 0.6 to $10^{-6}$ by using the equations (11)~(22). The simulation was effected under the conditions that the compensation time interval $T_3'$ which is the interval of turning-on of the switch S1 was selected to be 10 msec, the time width of the single pulse noise $T_{x2}$ was made to be 1 msec, and the peak value $e_N$ was asssumed to be equal to the value $E_1$ of the output voltage of the differential amplifier 7. Further, two kinds of time periods where a noise was superimposed were assumed as follows.

$T_{x3} = 0$ msec, $T_{xI} = 9$ msec; (1)

$T_{x3} = 0.2$ msec $T_{xI} = 8.8$ msec (2)

In FIG. 9, under both the two conditions that $T_{x3} = 0$ msec and $T_{x3} = 0.2$ msec, as the value of X decreases the noise influence degree K increases reversely. Particularly, if a noise is superimposed in the condition of $T_{x3} = 0$, that is, in the just end of the time portion $T_3'$, the tendency of increase of K is large. According to the present invention, X is selected to have a value in the range of from 0.1 to 0.6, so that the noise influence degree K is suppressed to be about 1.1 or less. On the contrary, in the case where it is intended so that compensation is to be effected to make the output value completely zero in the time portion $T_3'$ which is a compensation period time as in the above-mentioned JP-A-57-146113, it is necessary to select the value of X so as not to be larger than $10^{-4}$ as seen in FIG. 8, and therefore the output becomes 1.3 or 1.4 times due to the influence of a noise as seen in FIG. 9.

If the X is selected to be a value not larger about $10^{-2}$ when a noise is superimposed at the final period of the time portion $T_3'$, the output voltage $e_4$ of the amplifier 9 is compensated so as to be zero in the state that the output voltage includes the noise. Accordingly, the compensation voltage $E_{2d}$ includes an error corresponding to the noise. In the time portions $T_4$ and $T_5$ after the excitation current has been reversed in polarity, therefore, the output voltage $e_4$ of the amplifier 9 has a large error as shown in FIG. 9, because it is compensated by the compensation voltage $E_{2d}$ including an error. Further, though the amplification degree of the closed loop adjusting circuit 16 represented by the equation (6) changes as the value of X changes, this change in the amplification degree of the closed loop adjusting circuit 16 has been corrected in FIG. 9. Accordingly, in FIG. 9, the value along the ordinate indicates the variation of K relative to the change in X under the condition of fixed amplification degree.

Next, a case where general random noises are superimposed on the flow signal will be discussed.

Figure 4:
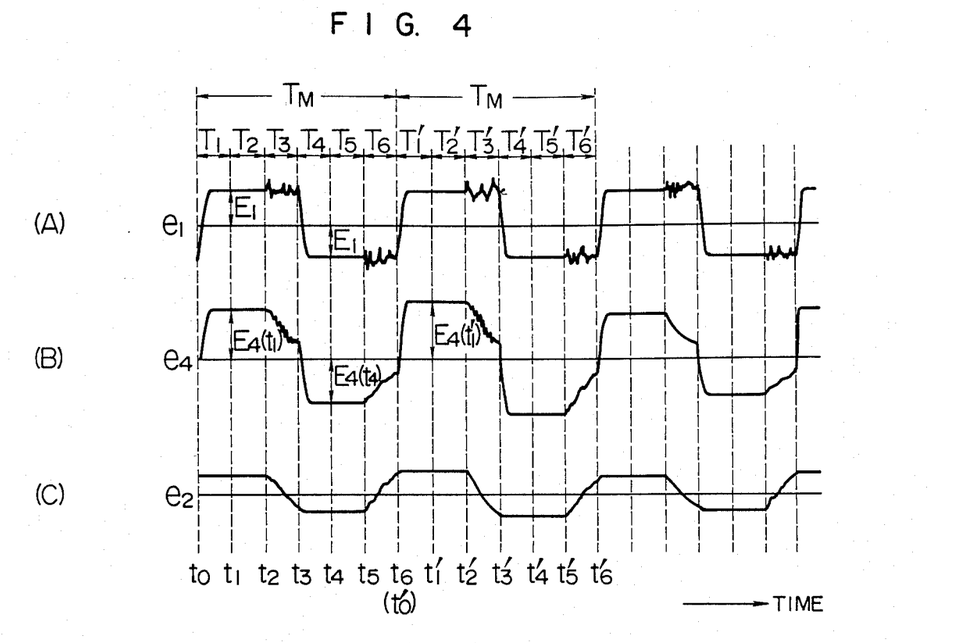
FIG. 4 is a signal waveform diagram corresponding to FIG. 2 and showing a case where AC noises are superimposed on the signals.

FIG. 4 has part (A) part (B) and part (C). Parts (A) to (C) of FIG. 4, similar to FIG. 2, show output signals at various portions in FIG. 1. In FIG. 4, however, a case where random noises are superimposed in each of the time portions $T_3$, $T_6$, $T_3'$, and $T_6'$ in which the switch S1 is turned on is illustrated.

Though such noises may be superimposed, generally, in all the periods of time portions, the noises superimposed in the time portions $T_3$, $T_6$, $T_3'$ and $T_6'$ are shown in FIG. 4 and noises superimposed in the other time portions are omitted, because discussion is being made on the degree of influence on the compensation operation by the noise superimposed in a compensation period ($T_3$ or $T_6$)

Figure 5:
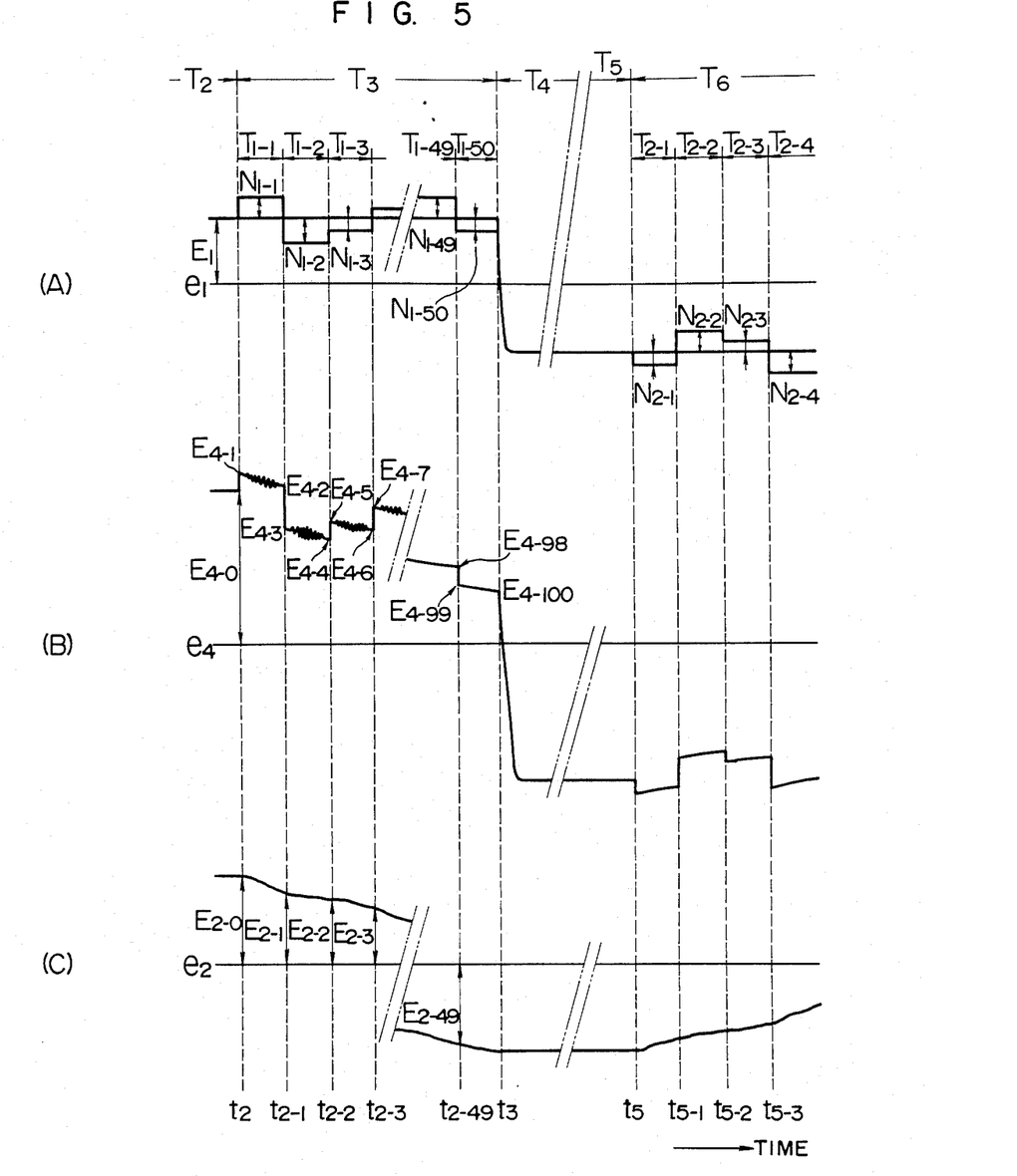
FIG. 5 is an enlarged signal waveform diagram showing part of FIG. 4 in detail at a point in time Where AC noises are superimposed on the signals and before and after the time.

FIG. 5 has part (A), part (B) and part (C). Parts (A) to (C) of FIG. 5 show signal waveform diagrams which are respective enlarged portions of parts (A) to (C) of FIG. 4 before and after the time portions $T_3$ and $T_6$ where noises are superimposed.

Though the output voltage $e_1$ of the differential amplifier 7 has only the effective signal component and therefore takes a value $E_1$ in the time portion $T_2$, the time portion $T_3$ is equally divided into 50 minor time portions $T_{1-1}$, $T_{1-2}$, $T_{1-3}$, . . . and $T_{1-50}$ so that a pulse-like noise is superimposed in each of the minor time portions. That is, assume now that a noise is superimposed on the value $E_1$ of the output voltage of the differential amplifier 7 in the minor time period $T_{1-1}$ in the condition that the level of the noise is kept constant at its peak value $N_{1-1}$ of positive polarity, and a noise is superimposed on the value $E_1$ in the next minor time portion $T_{1-2}$ in the condition that the level of the noise is kept constant at its peak value $N_{1-2}$ of negative polarity. Similarly to this, noises $N_{1-3}$, $N_{1-4}$, . . . and $N_{1-50}$ each having a level kept constant during the minor time portion are superimposed on the value $E_1$ in the next minor time portions $T_{1-3}$, $T_{1-4}$, . . . and $T_{1-50}$ respectively.

Similar to the time portion $T_3$ in FIG. 5, the time portion $T_6$ also is equally divided into 50 minor time portions $T_{2-1}$, $T_{2-2}$, $T_{2-3}$, . . . and $T_{2-50}$. That is, the 50 minor time portions $T_{1-1}$, $T_{1-2}$, $T_{1-3}$, . . . and $T_{1-50}$ in the time portion $T_3$ are replaced by the 50 minor time portions $T_{2-1}$, $T_{2-2}$, $T_{2-3}$, . . . and $T_{2-50}$ in the time portion $T_6$ respectively, and the respective peak values $N_{1-1}$, $N_{1-2}$, . . . and $N_{1-50}$ of the noise superimposed in the minor time portions in the time portion $T_3$ are replaced by the respective peak values $N_{2-1}$, $N_{2-2}$, . . . and $N_{2-50}$ in the time portion $T_6$.

Thus, the time portions $T_1 \sim T_6$ constitute a compensation cycle of one period TM.

Similarly to the time portions $T_1'$ and $T_6'$ are equally divided into 50 minor time portions $T_{3-1}$, $T_{3-2}$, $T_{3-3}$, . . . and $T_{3-50}$ and 50 minor time portions $T_{4-1}$, $T_{4-2}$, . . . and $T_{4-50}$ respectively, and assume that the respective peak values of the noises being superimposed in those minor time portions and varying at random are $N_{3-1}$, $N_{3-2}$, $N_{3-3}$, ... and $N_{3-50}$ and $N_{4-1}$, $N_{4-2}$, $N_{4-3}$, ... and $N_{4-50}$ respectively. The time portions $T_1' \sim T_6'$ constitute another compensation cycle of one period TM.

In this simulation, 50 compensation cycles each having one period TM are considered. Accordingly, there are $50 \times 50 \times 2 = 5000$ minor time portions as a whole and all the 5000 minor time portions are made equal in time width.

On the other hand, the number of noises superimposed in the minor time portions are 5000, and the respective peak values of the 5000 noises are $N_{1-1}$, $N_{1-2}$, $N_{1-3}$, ... and $N_{1-50}$; $N_{2-1}$, $N_{2-2}$, $N_{2-3}$, ... and $N_{2-50}$; ...; and $N_{100-1}$, $N_{100-2}$, $N_{100-3}$, ... and $N_{100-50}$ which are obtained by sampling the variations caused in the output voltage $e_1$ of the differential amplifier 7, 50 times in each of portions corresponding to the 100 time portions $T_3$, $T_6$, $T_3'$, $T_6'$, ...

More specifically, each compensation time interval, that is, each of the 100 time portions $T_3$, $T_6$, $T_3'$, $T_6'$, ..., is set to 10 msec, and therefore each of the minor time portions is 0.2 msec.

Thus, the output voltage of the differential amplifier 7 which varies at random due to superimposition of noises is normalized at every 0.2 msec over 10 msec to thereby obtain 5000 pieces of data which are used as a set of noise model in simulation. Accordingly, the result of simulation can be regarded to be the same as the operation in an actual electronic circuit.

The method of the foregoing simulation will be described hereunder.

In FIG. 5, though the output voltage $e_1$ of the differential amplifier 7 becomes $(E_1 + N_{1-1})$ at the point in time $t_2$ because a noise is superimposed immediately after the switch S1 is turned on at the point in time $t_2$, the output voltage $e_2$ of the integrating circuit 15 does not change instantaneously and is kept as it is at a value $E_{2-0}$, and the value $E_4$ of the output voltage $e_4$ of the amplifier 9 becomes as follows.

$$E_{4-1} = A \cdot (E_1 + N_{1-1} + E_{2-0}) \tag{23}$$

The integrating circuit 15 integrates the output voltage of the amplifier 9 with the time constant $C1 \times R1$, and the value $E_{2-1}$ of the output voltage $e_2$ of the integrating circuit 15 at the point in time $t_{2-1}$ becomes as follows.

$$E_{2-1} = E_{2-0} \cdot X_a - (E_1 + N_{1-1}) \cdot (1 - X_a) \tag{24}$$

in which $X_a$ represents the value as follows.

$$X_a = \epsilon^{-(A/C1 \cdot R1) \cdot Ta} \tag{25}$$

The equation (25) is the same as the equation (2) except that the integration time is changed from $T_3$ to $T_a$.

At the point in time $t_{2-1}$ where the output of the integrating circuit 15 has changed from the value $E_{2-0}$ to $E_{2-4}$, the value $E_{4-2}$ of the output voltage $e_4$ of the amplifier 9 becomes as follows.

$$E_{4-2} = A \cdot (E_1 + N_{1-1} + E_{2-1}) \tag{26}$$

Even if the peak value of noise has instantaneously changed from $N_{1-1}$ to $N_{1-2}$ at this point in time $t_{2-1}$, the output voltage $e_2$ of the integrating circuit 15 does not change but is maintained as it is at the value $E_{2-1}$.

Accordingly, the value $E_{4-3}$ of the output voltage $e_4$ of the amplifier 9 is obtained by replacing the value $N_{1-1}$ by $N_{1-2}$ in the value $E_{4-2}$ of the equation (26) as follows.

$$E_{4-3} = A \cdot (E_1 + N_{1-2} + E_{2-1}) \tag{27}$$

It should be noted that the peak value of noise $N_{1-2}$ in the equation (27) is a negative one as seen in FIG. 5.

The integrating circuit 15 integrates the output voltage of the amplifier 9 in the next minor time portion $T_{1-2}$, and the value $E_{2-2}$ of the output voltage $e_2$ of the integrating circuit 15 at the point in time $t_{2-2}'$ becomes as follows.

$$E_{2-2} = E_{2-1} \cdot X_a - (E_1 + N_{1-2}) \cdot (1 - X_a) \tag{28}$$

The value $E_{4-4}$ of the output voltage $e_4$ of the amplifier 9 due to the change of the value of the output voltage $e_2$ of the integrating circuit 15 at the point in time $t_{2-2}$ becomes as follows.

$$E_{4-4} = A \cdot (E_1 + N_{1-2} + E_{2-2}) \tag{29}$$

By calculating the influence of noises in every minor time portion in the same manner as described above, it is possible to obtain the output value $E_4(t_4)$ at the point in time $t_4$ where no noise exists after the polarity of the excitation current is reversed (see FIG. 4).

This method is the same as that in which the foregoing method in which influence of a single pulse-like noise is analyzed. The value $E_4(t_4)$ has an error due to a noise superimposed in the time portion $T_3$.

Through quite the same process as that described above, it is possible to obtain the value $E_4(t_1')$ in the first half of the next compensation cycle TM' which is affected by the noises $N_{2-1}$, $N_{2-2}$, $N_{2-3}$, ... and $N_{2-50}$ superimposed in the time portion $T_6$.

In the same manner as above, it is possible to obtain 100 outputs in total over all the 50 compensation periods by obtaining the output affected by noises in each of the first and second halves of every compensation period.

All the 50 noises superimposed in each of the 100 time portions $T_3$, $T_6$, $T_3'$, $T_6'$, ... are different in pattern from one another, and therefore all the output voltages affected by those noises in the respective half periods are different from one another.

Though being complex at a glance, the foregoing calculation can be very easily executed by means of a computer if the process of calculation is programmed.

Of the thus obtained 100 output voltages, the 50 output voltages in the respective first half periods of the 50 compensation periods were used as they are and the remainder 50 output voltages in the respective second half periods of the 50 compensation periods were used after being multiplied by $-1$ so that they were reversed in the sign. This is because to make the processing equivalent to that executed by means of the sampling and holding circuits 10 and 11 and the subtracting circuit 12 of FIG. 1. Because the thus obtained 100 output voltages in the respective half periods of the 50 compensation cycles varied from one another, a standard deviation $\sigma$ of the variations was used to represent the degree of influence of the noises.

Figure 10:
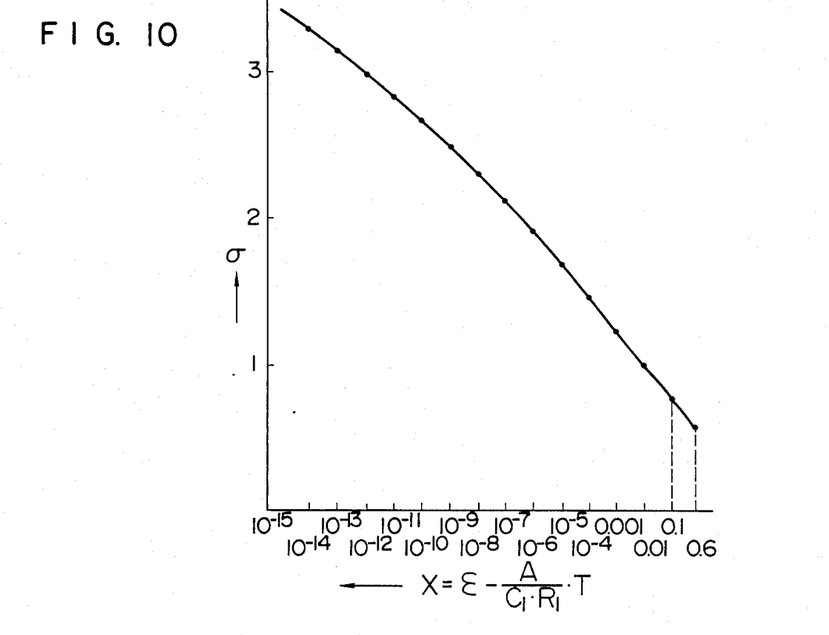

FIG. 10 shows the degree of influence in which the ordinate represents the standard deviation $1\sigma$ of the variations and the abscissa represents the value of X expressed by the equation (2). FIG. 10 shows the fact that as the value of X decreases the noise the variation of the output of the compensation loop becomes large reversely.

Though the amplification degree of the closed loop adjusting circuit 16 represented by the equation (9) changes as the value of X changes, this change in the amplification degree of the closed loop adjusting circuit 16 has been corrected in FIG. 10. Accordingly, FIG. 10 shows the state of change in the variations of the output when the value of K is changed under the condition of fixed amplification degree. The noises used in the simulation were the 5000 outputs obtained by sampling the variations in the output voltage of the differential amplifier 7 in the conditions of use which are an object of the present invention, and the 5000 data were used as a set of noise model in all the simulations for the values of X in the range of from 0.6 to $1\times10^{-15}$. In the simulation, noises were superimposed only in the time portions $T_3$, $T_6$ ... in which the switch S1 was turned on, and no noise was superimposed in the time portions $T_2$, $T_5$ ... in which the switch S2 or S3 was turned on so that the flow signal was stored.

From the three points of view, FIG. 10 shows the influence given to the closed loop adjusting circuit 16 purely by the random noise model of a constant level when the value of X is changed.

As described above in each of the two kind of simulations of the cases where a single pulse-like noise is superimposed and random noises are superimposed respectively, the influence of the noise onto the output of the closed loop adjusting circuit 16 becomes large reversely as the value of X becomes small. The influence of noises onto the closed loop adjusting circuit 16 causes a large error when a noise is superimposed in the last period in the compensation cycle. This is because an error corresponding to the peak value of the noise is generated since the closed loop adjusting circuit 16 makes compensation to make the output value including the noise zero.

On the other hand, in the case where a single pulse-like noise is superimposed in the first half period of the compensation cycle, the influence of the noise is less.

In this point of view, the possibility that large noises are superimposed in the last period of a compensation cycle and the possibility that large noises are superimposed in the other portions of the compensation cycle are even to each other for the same time width, and therefore the influence of the noises varying at random is considered such that each compensation cycle has a first period in which the output of the closed loop adjusting circuit 16 is largely affected by noises and another half period in which the output of the closed loop adjusting circuit 16 is less affected by noises so that variations are generated in the output.

Being caused by the influence of noises varying at random, the variations in the output of the closed loop adjusting circuit 16 have a normal distribution centering around a correct output value when no noise exists. Accordingly, even if there is influence of noises, the mean value in a long time shows a correct value of measurement. However, it is desirable to carry out the flow measurement in a short time to the utmost. If the compensation in each compensation cycle is made to be about 60%~10% of the value before the compensation, that is, if the value of X is made to be 0.6~0.1, it is possible to make lesser the variations caused in the output even when noises occur; and therefore it is possible to carry out flow measurement in a short time.

Figure 7:
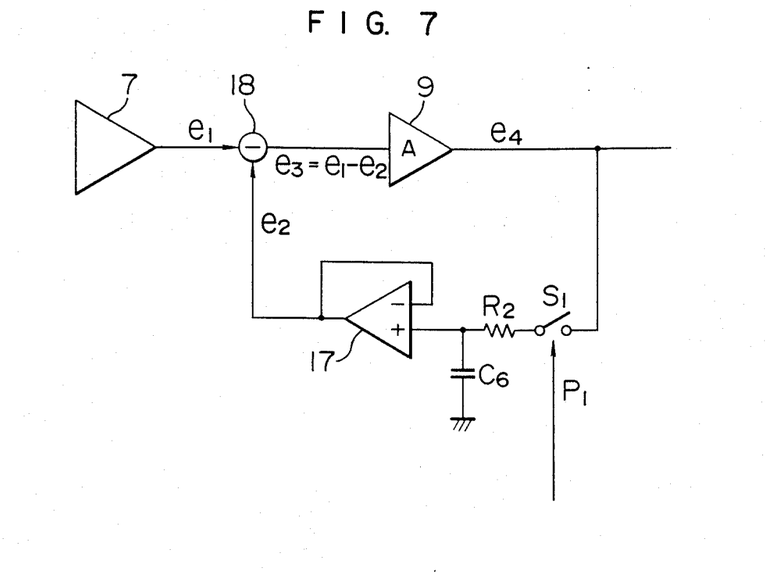
FIG. 7 is a block diagram showing a part of the block diagram of FIG. 1.

FIG. 7 shows another embodiment of the present invention. Since this embodiment is the same in operation as the embodiment of FIG. 1, only the portions different from the latter will be described hereunder.

A switch S1 is turned on at he same timing as the switch S1 of FIG. 1, so that an output voltage $e_4$ of an amplifier 9 is integrated with a time constant $C2\times R6$ and an output of an output voltage of $e_2$ of an impedance converter 17 connected to a junction between a resistor R6 and a capacitor C6 is applied as a compensation voltage to a minus input of a subtracting circuit 18.

In the embodiment of FIG. 1, the integrating circuit 15 is of the inverter type in which the output $e_2$ thereof is reversed in phase relative to its input, and therefore the output $e_2$ is applied to the adding circuit 8. In the embodiment of FIG. 7, on the other hand, the impedance converter 17 is of the non-inverting type, the output $e_2$ thereof is connected to the subtracting circuit 18 so as to constitute a closed loop adjustment circuit for actuating the compensation function. Thus, the embodiment of FIG. 7 has a function equivalent to that of the embodiment of FIG. 1.

Thus, according to the present invention, in amplifying a signal including a large noise, it is possible to make compensation which is hardly affected by noises varying at random included in a trouble voltage while eliminating a DC offset generated by a differential amplifier and an AC amplifier at the next stage.

Further, since the differential amplifier 7 is connected through an electrode and a capacitor so that a DC trouble voltage generated in the electrode is blocked, the differential amplifier 7 is not saturated and the amplification degree of the differential amplifier 7 can be made large to an extent that it is limited by its own offset. Thus, the invention is effective to an electromagnetic flowmeter of the low power consumption type.

I claim:

1. In magnetic induction flow measurement in which a flow rate of a fluid is measured by means of a DC magnetic field having a periodically reversed polarity, a method of making compensation for a DC offset voltage generated in an amplifying circuit in an electromagnetic flowmeter comprising the steps of: sampling and storing a signal voltage produced across electrodes in each of a pair of sampling periods where the magnetic field takes a positive polarity and a negative polarity respectively and forming a difference between the sampling values as n output signal voltage; sampling and storing the signal voltage in a compensation period following said pair of sampling periods to thereby produce a compensation voltage to be superimposed onto said signal voltage; making compensation on said signal voltage by using said compensation voltage and holding said compensation voltage until a succeeding compensation period; in which a time constant of a compensation circuit is made large so as to make the compensation in said compensation period be 60%~10% of the value before compensation to thereby make the compensation for the DC offset voltage generated in said amplifying circuit in said electromagnetic flowmeter without being affected by AC noises generated across said electrodes.

2. The method according to claim 1, in which said compensation circuit is an integrating circuit including an operational amplifier.

3. The method according to claim 1, in which said compensation circuit is constituted by an impedance converter.

4. In magnetic induction flow measurement in which a flow rate of a fluid is measured by means of a DC magnetic field having a periodically reversed polarity, an apparatus for making compensation for a DC offset voltage generated in an amplifying circuit in an electromagnetic flowmeter in which a signal voltage produced across electrodes is sampled and stored in each of a pair of sampling periods where the magnetic field takes a positive polarity and a negative polarity respectively, a difference between the sampling values is formed as an output signal voltage, the signal voltage is sample and stored in a compensation period following said pair of sampling periods to thereby produce a compensation voltage to be superimposed onto said signal voltage, and compensation is made on said signal voltage by using said compensation voltage which is held until a succeeding compensation period; said apparatus comprising:

- a pair of said electrodes provided on a tube through which an electrically conductive fluid is made to flow;
- a differential amplifier to which said pair of electrodes are respectively connected through capacitors;
- a subtractor having two inputs one of which is connected to an output of said differential amplifier;
- an amplifier having an input connected to an output of said subtractor;
- a CR integration type time constant circuit connected in cascade with an impedance converter;
- a switch inserted between said amplifier and said time constant circuit for sampling said signal voltage in said sampling period; said impedance converter having an output for generating said compensation voltage, said output being connected to the other, subtraction side of said subtractor.

* * * * *